United States Patent Office 3,709,806
Patented Jan. 9, 1973

3,709,806
PROCESS FOR THE PREPARATION OF RADIATION-CROSSLINKABLE FOAMABLE POLYOLEFIN PARTICLES
Satoyuki Minami, Yoshiaki Shinke, Ahozi Saito, and Atsushi Osakada, Otsu, Japan, assignors to Toray Industries, Inc., Tokyo, Japan
No Drawing. Filed June 25, 1971, Ser. No. 157,008
Claims priority, application Japan, June 27, 1970, 45/56,355
Int. Cl. C08d 1/00; C08f 1/00
U.S. Cl. 204—159.2          14 Claims

ABSTRACT OF THE DISCLOSURE

A process is provided for manufacturing foamable polyolefin particles. In the process of this invention a polyolefin resin is blended with a hydrocarbon additive which has a boiling point which is higher than the melting point of the polyolefin resin and a chemical blowing agent which decomposes into gas upon being heated. The resulting mixture is shaped into substantial void free particles and irradiated with radial radiation or ultraviolet radiation to crosslink the mixture. The product of this process is especially used in manufacturing shaped articles using conventional chest molding techniques.

BACKGROUND OF THE INVENTION (1) Field of the invention

The present invention relates to a process for the preparation of foamable polyolefin particles.

(2) Description of the prior art

Heretofore, thermoplastic resin foams have been prepared by various methods. One of the more widely used methods is the chest molding method. In this method foamable particles are expanded inside a mold which is closed but has vents to allow gases to escape. The chest molding method is one of the most widely used methods for molding foamed articles having relatively complex shapes. This method has heretofore, for example, been utilized for the preparation of a polystyrene foams on a large scale. The foamed articles produced by this method are widely used for example as packaging material.

The chest molding method using foamable particles have not been successfully utilized with any other thermoplastic resins than the polystyrene resins because the preparation of foamable thermoplastic particles required for the chest molding method from thermoplastic resins other than polystyrene resins have heretofore been very difficult.

Foamable polystyrene particles are conventionally prepared by a process in which particles of polystyrene resin having a diameter of 0.1 to 2 mm. and a spherical shape obtained by suspension polymerization, are impregnating either during or after suspension polymerization with an evaporation type of blowing agent. The blowing agents which are used do not dissolve the polystyrene and are either gases or liquid at room temperature. Typical blowing agents which are employed are, for example, petroleum ether, pentane, hexane, heptane and methylene chloride. The essentially non-expanded polystyrene particles which are used in the molding process are not crosslinked.

The process used to prepare foamable polystyrene resins can not be used to prepare foamable polyolefin resins because of certain inherent difficulties. When the processes used for polystyrene resins are employed to foam non-polar thermoplastic resins such as polyethylene or polypropylene, the foamable particles which are obtained are unsatisfactory for chest molding. The reason for this is because it is difficult to impregnate the polyolefin resins with the relatively large amount of evaporation type foaming agent such as the hydrocarbon compounds mentioned above required for foaming. Even when the foaming agent is incorporated by a special technique, when the impregnated resin is heated to a temperature above the softening temperature of the resin the vaporized foaming agent is not entrapped in the polyolefin resin, but escapes, and an unsatisfactory foam is obtained.

Attempts have heretofore been made to prepare a polyolefin resin foam using the chest molding method. One such proposed process is disclosed in Belgian Pat. No. 697,785. In this process a polyolefin resin and an evaporation type foaming agent are blended together inside an extruder. The resulting mixture is extruded in the form of strands which are then cut to obtain foamed particles. The particles are crosslinked. Then the particles are fused and shaped according to the chest molding method. In this process, using a chest mold, the polyolefin particles are essentially completely foamed before molding. Because of this, it is necessary to adopt special molding conditions in terms of heating the particles and the pressure maintained inside the chest mold. Chest molding is used to mold the final shaped article and is generally carried out at a place where the final article is used, rather than the place where the particles of the starting material are prepared. The transportation and storage of expanded particles of polyolefin resins is, therefore, quite expensive in comparison with storage and transportation costs of non-expanded particles containing a foaming agent such as the aforesaid polystyrene. It can be seen that molding prefoamed polyolefin using the chest molding method is especially disadvantageous because of transportation and storage costs involved above.

A process has been suggested for produced non-expanded particles using resins of the polyolefin series in U.S. Pat. 3,213,071. In this process the polyolefin resin is blended with a chemical foaming agent which decomposes when heated to generate gas. The resulting mixture is shaped and chopped to obtain foamable particles. The specific gravity of the foamable polyolefin particles obtained in accordance with this process is substantially the same as the specific gravity of the starting polyolefin resin. However, the foamable polyolefin particles obtained in accordance with this process have the disadvantage that the final shaped foamed articles often do not have satisfactory physical properties. This is partly because the particle size is not uniform in that the desired special shaped particles are difficult to obtain. This is inherently due to the process which is used to produce the foamable particles. A further disadvantage of this process is that the foaming agent inevitably exists on the surfaces of the particles. In the subsequent foaming step, the gas produced by decomposition of the foaming agent escapes from the polymer and the final product does not sufficiently increase in volume. Using this method it is especially difficult to increase the effective foaming ratio by increasing the amount of the foaming agent. A further disadvantage of this is that in order to prepare foamable particles which are substantially free of voids, it is necessary to use a chemical foaming agent which decomposes at a relatively high temperature. Accordingly, using this process it is not possible to use a foaming agent whose decomposition temperature is relatively low so as to be able to conveniently carry out the foaming step at a place where the final shaped article is actually used.

It is accordingly an object of the present invention to provide substantially void free foamable polyolefin particles.

Another object of the present invention is to provide foamable polyolefin particles from which shaped foam articles having complicated configurations can be molded using conventional chest molding techniques.

A further object of the present invention is to provide substantially void-free polyolefin foamable particles which can be foamed at a relatively low temperature.

Other objects and advantages of this invention will become further apparent hereinafter and from a reading of the subjoined claims.

SUMMARY OF THE INVENTION

The objects of the present invention have been achieved by providing a process for producing foamable polyolefin resins comprised of the steps of uniformly blending a polyolefin resin, a hydrocarbon additive having a boiling point which is above the softening point of the polyolefin resin and a foaming agent which on being heated decomposes and generates a gas; shaping the resulting mixture into substantially void free particles, and then crosslinking the particles by irradiating them with ionizing radial rays or ultraviolet rays. In the preferred process of the present invention, foamable particles are formed into substantially spherical particles by granulating the mixture of the polyolefin resin, the hydrocarbon additive, and the foaming agent. To accomplish this result the mixture is extruded into hot water from an extruder in the shape of a strand and thereafter chopped into particles in the hot water.

DESCRIPTION OF THE PREFERRED EMBODIMENTS

The polyolefin resins which are employed in the present invention and referred hereinafter and in the claims, are selected from polyolefinic resins which consist essentially of a polymer, a copolymer, or a blend polymer of α-olefins having 2 to 6 carbon atoms, and resinous compositions containing at least 50 mol percent of α-olefins having 2 to 6 carbon atoms.

The polyolefins which can be employed include for example, high density polyethylene, intermediate density polyethylene, low density polyethylene, polypropylene, polybutene, ethylene-propylene copolymer, ethylene-vinyl acetate copolymer, and ethylene-acrylic acid ester copolymer. In addition to the above noted polyolefin polymer, copolymer, and blends of polyolefin, compositions can be employed which are obtained by blending 50 mole percent or more of one or more polyolefins with one or more polymers such as the chlorinated polyethylene, chlorinated polypropylene, polybutadiene, polyisoprene, polyisobutene, styrene-butadiene copolymer, polyvinyl chloride and polyamide. The most preferable polyolefins for employment in this invention are polyethylenes, ethylene-vinyl acetate copolymer, polypropylene and ethylene-propylene copolymer.

The polyolefin compositions can also contain the usual additives such as organic or inorganic filler, stabilizer, extender, pigment, flame retardant and so forth which do not adversely affect the subsequent foaming process.

The hydrocarbon additive included in the polyolefinic compositions of this invention can be defined broadly as being a hydrocarbon compound having a boiling point higher than the softening temperature of the polyolefin resin employed in the present invention. The preferred hydrocarbons are benzene, cyclohexane, Tetralin and substituted derivatives thereof. The preferred class of hydrocarbon additives is represented by the formula:

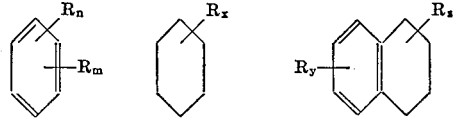

wherein R is an alkyl radical having 1 to 8 carbon atoms, R' is an alkenyl radical having a single double bond and 2 to 8 carbon atoms, $m$ is an integer 0 to 3 and $n$ is an integer from 0 to 6, the sum of $n+m$ being 0 to 6 and $y$ and $z$ are integers of 0 to 4.

Specific examples of compounds include benzene, cyclohexane, Tetralin and alkyl substitution products thereof for example, toluene, ethyl benzene, xylene, n-propyl benzene, amyl benzene, ethyl toluene, trimethyl benzene, tetramethyl benzene, pentamethyl benzene, hexamethyl benzene, cyclohexane, tetralin styrene, methyl styrene, dimethyl styrene, trimethyl styrene, ethyl styrene, diethyl styrene, propyl styrene, butyl styrene, hexyl styrene, heptyl styrene, octyl styrene, α-methyl styrene, isopropenyl styrene, isopropyl α-methyl styrene, divinyl benzene, divinyl toluene, divinyl xylene, and alkyl substituted derivatives thereof. It should be appreciated that blend of 2 or more of said hydrocarbons can likewise be used.

The hydrocarbon additive is impregnated and dissolved into the polyolefin resin mentioned above at an elevated temperature. The hydrocarbon additive effectively plasticizes the polyolefin resin during the blending step with the foaming agent and the subsequent granulating step. It is important that the boiling point of the hydrocarbon additive be higher than the melting point of the polymer, otherwise it will evaporate during the mixing step and the desired objects of this invention will not be achieved.

The amount of the hydrocarbon compounds which is added is between about 1–30% based on the weight of the polyolefin resin. When less than about 1% by weight is used, a sufficient plasticizing effect is not obtained at the time of mixing. In addition, if less than about 1% of the hydrocarbon additive is used, excess contraction of the shaped articles will occur during cooling after foaming when using the chest molding method. However, when excessively large amounts of the hydrocarbon additives is employed, it is difficult to impregnate all of it into the polyolefin by conventional processes. Even when large amounts of hydrocarbons are impregnated into the polyolefin using special methods, the foaming ratio during prefoaming tends to be lowered. The preferred amount of the hydrocarbon additive to employ is about 2 to 10% by weight of the polyolefin.

The impregnation of the polyolefin with the hydrocarbon additive may be carried out before or after the foaming agent has been blended with the polyolefin resin. It is preferable in cases where the foaming agent decomposes at a relatively low temperature that the hydrocarbon additive be initially impregnated into the polyolefin resin.

The foaming agents used in the present invention have decomposition temperatures which are above the softening point of polyolefin resins and lower than about 200° C. Typical foaming agents are for example, sodium bicarbonate, ammonium carbonate, diazoamino benzene, azodicarbonamide, azodicarboxylic acid ester, barium azodicarboxylate, strontium azodicarboxylate, hydrazodicarbonamide, azobisisobutylonitrile, dinitrosopentamethylene tetramine, trinitroso pentamethylene tetramine, trinitrose trimethylene triamine, N,N'-dimethyl terephthal amide, benzene sulfonyl hydrazide, p-toluene sulfonyl hydrazide, toluene-2,4-disulfonyl hydrazide, p-toluene sulfonyl semicarbazide, p,p'-hydroxy bis benzene sulfonyl hydrazide, p,p'-hydroxy bis benzene sulfonyl semicarbazide, bis benzene sulfonyl hydrazide, diphenyl sulfonyl hydrazide, diphenylsulfone-3,3'-disulfonyl hydrazide, benzene-1,3-disulfonyl hydrazide, p-toluene sulfonyl hydrazide, p,p'-diphenyl azide, p-toluene sulfonyl azide, nitroguanadine, trihydrazino-sym-triazine and nitroureas. The foaming agents which may be employed in this invention are, however, not limited to those set out above.

It is preferable in the process of this invention that the foaming agent used to produce foamable particles be decomposed into gas by low pressure steam. Most preferably, they should have a decomposition temperature of about 100° C. to 160° C. The lower limit of the decomposition temperature is determined by the condition required to manufacture foamable particles which are free of voids. The selection of the foaming agent is therefore dependent on the particular polyolefin resin used. When considering the selection of a foaming agent for use in the present invention, it should be kept in mind that the decomposition temperature of the foaming agent must be above the softening point of polyolefin resin. The most preferable foaming agents are compositions whose main component is azodicarbonamide or dinitroso pentamethylene tetramine. If the decomposition temperature of a conventional foaming agent meets this particular condition, the other properties generally are likewise satisfactory.

Normally, when using one of the above noted foaming agents, an amount of a foaming assistant is employed along with the foaming agent to insure that the foaming agent will have the desired decomposition temperature when the composition is foamed. As such a foaming assistants there are, for example, citric acid, succinic acid, tartaric acid, metallic salts of these acids; the oxides, chorides, sulfates, nitrates, carbonates, bicarbonates, and acetates of lead, zinc, cadmium, chromium iron, manganese, cobalt, calcium, barium, and strontium. The foaming assistants are not limited to those specifically mentioned above.

There is no exact limit with regard to the relative amount of foaming agent which can be employed. The amount is preferably adjusted depending upon the foaming magnification desired and normally it is 1 to 30% by weight based on the unfoamed polyolefin resin.

In the process of the present invention, the mixing and kneading of the polyolefin resin, the hydrocarbon additive and the foaming agent can be conducted in the conventional manner. For example, the polyolefin resin which has previously been impregnated with the hydrocarbon additive and the foaming agent can be blended together using a V blender, ribbon mixer Henschel's mixer or a tumbler, and thereafter kneading by hot rolls, a Bumberry's mixer, calendar rolls, cokneader, mixtruder or a screw extruder at a temperature which is above the softening temperature of the polyolefin resin but below the decomposition temperature of the foaming agent or the composition of the foaming agent and foaming assistant. What is important in this step is to uniformly disperse the foaming agent in the polyolefin resin. If the blending is not uniform, it can adversely affect the quality of the finally obtained foamed shaped articles. In the kneading step, it is also important to select temperature conditions so that foaming agents will not prematurely decompose.

The uniformly blended and kneaded polyolefin resin containing the hydrocarbon additive and the foaming agent is shaped into particles by various conventional processes. Foamable particles having no uniformity of shape such as particles obtained by pulverizing a block can be used to produce a shaped article by the chest molding method. However, it has been found that in order to obtain a final shaped article having a smooth surface and an excellent uniformity in the interior of the shaped articles cylindrical or granular particles are preferably employed.

It is most preferable to use particles which are spherical in shape because of the ease of prefoaming and foaming inside a mold; the convenience of transfering particles by an air stream and the superior quality of the final shaped articles.

It is preferable that the foamable particles have an average volume of about 0.01 to 2 cc. and a diameter of about 0.1 to 6 mm. When the volume and diameter are larger than the above noted upper limits, uniform foaming and shaping is not obtained and the central portion of the particles is not completely foamed.

One process which has proven to be satisfactory is to extrude the resin composition from an extruder in the shape of strands and thereafter chop the strands to prepare the foamable particles. In this process it is possible to extrude the polyolefin resin composition without decomposing the foaming agent because the extruding temperature is lowered by the presence of the hydrocarbon additive.

The most preferable method of granulation in accordance with the present invention comprises kneading the polyolefin resin, the hydrocarbon compound, and the foaming agent and thereafter extruding the mixture in the form of strands directly from the extruder into hot water having a temperature of from about 50–100° C. The extruded strands are cut in the hot water before they cool and solidify. The particles thus obtained may then be cooled and solidified in hot air of a same temperature as the bath.

The particles, however, are preferably allowed to remain in the hot water until the temperature of the particles become substantially the same as that of the hot water bath. The foamable particles thus cooled and solidified in the hot water have a substantially spherical shape, due to the plasticizing effect of the hydrocarbon compound and surface tension of said composition.

An additive benefit of this method is that when the polyolefin resin is heated to a high temperature and then extruded into hot water and granulated only the hydrocarbon additive on the surface layer of the resulting particles is extracted. In the subsequent pre-foaming and foaming step inside the mold foamed beads exhibit a so-called skin layer effect. This is preferable in that the surface layer is foamed less than the interior of the particles. A further advantage of extruding and cutting in hot water in the granulation process is that it can be conducted at higher speeds than the conventional strand cutting method.

When the temperature of hot water is less than 50° C. the extruded composition is suddenly cooled and solidified. The cutting becomes more difficult, while at the same time, the surface tension is lowered. The shape of the extruded particles is less likely to become spherical. There is only a slight extraction of the hydrocarbon from the surface of the particles and so the foamed particles do not exhibit the desired skin layer effect.

The foamable particles which are obtained in accordance with this invention have a specific gravity which is substantially the same as that of the starting polyolefin resin. This is one characteristic of the foamable particles obtained by the process of the present invention. Because of the presence of a hydrocarbon additive in the resin composition, it is also possible to lower the temperature conditions for the granulating step and to prepare substantially void free foamable particles.

The granulated foamable polyolefin composition is subsequently crosslinked by irradiation with ionizing radial rays or ultraviolet rays. Ionizing radial rays are, for example, alpha rays, beta rays, gamma rays, electron beam, proton rays, neutron rays, and X-rays. In commercial production, an accelerated electron beam is most preferably employed. When carrying out crosslinking, depending upon the kind of the polyolefin resins employed, it may be necessary to add a crosslinking accelerator. For example, when polyethylene is crosslinked by ultraviolet radiation, it is necessary to add ultraviolet sensitizer such as benzophenone to the starting mixture. As way of further example, when polypropylene is crosslinked by an accelerated electron beam, it is necessary to add a known polyfunctional substance such as a crosslinking accelerator to the starting mixture.

In general, the crosslinking is continued until a gel ratio of about 10–80%, preferably 20–60% is obtained. The gel ratio as referred to herein is determined by making 0.2 g. slice of the sample and treating said slice with 50 cc. of Tetralin at 135° C. for 3 hours and measuring the insoluble portion.

The gel ratio is calculated according to following formula:

$$\text{gel ratio (percent)} = \frac{\text{weight of insoluble portion (g.)}}{\text{weight of sample (g.)}} \times 100$$

When crosslinking is conducted using an electron beam accelerator, the extruded material is irradiated so that the absorbed amount of radiation is between 1 to 20 megarad (Mrad). The irradiation with radial rays may be conducted at any temperature below the softening point of foamable particles and is normally carried out at room temperature in air.

It is possible if desired, to pre-foam the foamable polyolefin particles of the present invention until the volume increases to 2–50 times the initial volume. The pre-foaming is carried out by known methods, as for example, by treating the foamable polyolefin particles with hot air or hot vapor. The prefoamed particles can be heated in a chest which is closed, but not gas tight and after a relatively short cooling period removed in a predetermined shape from the chest. When using the chest molding method for prefoaming, it is preferable to use steam, hot air, or a mixture of steam and hot air for heating the polyolefin particles.

The foamed polyolefin shaped articles prepared using the foamable polyolefins of this invention and the chest molding method generally have a fine pore structure and an apparent density of 0.02 to 0.3 g./cm.$^3$. The foams have excellent elasticity, heat insulating properties, and are water, moisture, solvent and weather resistant. The foams can be used as a protective wrapping material, flotation material, an adiabatic material and cushioning material for vehicle head-rest and the like. There are of course, other uses for the foams of this invention.

The foamable particles of the present invention have many advantages. It is very important that the foamable particles used for chest molding method be foamable at as low a temperature as possible. However, the foaming agent must not decompose during the process for preparation of the foamable particle, for example, during the mixing and kneading of the polyolefin resin with the foaming agent. It is accordingly necessary that the mixing and granulating steps likewise be carried out at a low temperature. One of the advantages of the process of the present invention is that the addition of the hydrocarbon additives to the resin composition makes it possible for the granulation process to be carried out at a low temperature without decomposition of the foaming agent.

The specific gravity of the foamable particles prepared in accordance with the process of this invention is substantially the same as that of the starting polyolefin polymer. In addition, large pores do not form during foaming. Further, due to the fact that the specific gravity of the foaming particles is high, it is simpler to store and transport the foamable particles to the location where the foamed shaped articles are actually molded.

The crosslinking of the polyolefin resin while it is impregnated with the hydrocarbon additive during prefoaming is highly advantageous as the gas is prevented from escaping. The gas retaining ratio is excellent and excellent foamed shaped particles are obtained. The foamable material of the invention when foamed also exhibits improved mechanical, chemical and thermal properties. If the polymer is not crosslinked, the gas retaining property of the polymer is poor and it is very difficult to make foam having an apparent specific gravity less than 0.2 g./cm.$^3$. Even if a polyolefin which is not impregnated with the hydrocarbon, is crosslinked, a great difference is still encountered in the effective gas retaining ratio at the time of foaming.

Since the crosslinking is carried out by ionizing radial rays or ultraviolet rays, after preparing the particles, the process of this invention is very satisfactory for preparing particles in a shape or size which will be most convenient when the particles are foamed and shaped.

Because a decomposition type foaming agent is used as the foaming agent, it is not necessary to store the unformed product in a sealed container as in the case of the conventional polystyrene foamable particles. The product of this invention even when stored for long periods of time do not change substantially with regard to foamability.

When the foamable particles obtained by the process of the present invention are initially pre-foamed and then completely foamed inside a mold to obtain shaped articles, contraction of the particles due to cooling inside the mold is quite small and the foamed shaped articles that are obtained are excellent as compared with the articles obtained by the conventional processes.

The following examples are given by way of further illustration of the process of the present invention and not intended to limit in any way the scope of the subject invention beyond that of the subjoined claims. All parts and percentages in the following examples are parts and percentages by weight, not volume unless otherwise noted.

EXAMPLE 1

One hundred parts of low density polyethylene which was pulverized into particles of less then 40 mesh (MI—3.5, specific gravity 0.92), 21 parts of azodicarbonamide, 2 parts of zinc oxide and 1.2 parts of zinc chloride were blended together and the mixture was impregnated with 5 parts of a mixture of ortho and meta xylene at room temperature and atmospheric pressure in a sealed container. The resulting composition was allowed to stand for 24 hours in the sealed container. The composition was then fed into an extruder and mixed and kneaded at a barrel temperature of 100° C. The composition was extruded through a die plate having 1.5 mm. diameter orifices while the surface of the die plate was washed with 85° C. water. Immediately thereafter the extruded composition was cut while hot into 1.5 mm. lengths by a rotary blade. The average specific gravity of the resultant particles was 0.93. The beads were hardly foamed or expanded.

Then the above procedure was repeated except that the addition of xylene was omitted. The mixture on being hot extruded at a barrel temperature of 100° C. foamed considerably. It was not possible to obtain particles having a specific gravity higher than 0.70.

The particle which were impregnated with xylene and the particles which were prepared without xylene were irradiated with an electron beam in the air, so that the absorbed amount of radiation was 4, 8, and 16 megarad. The surfaces of the resultant particles were covered with silicic anhydride by heating, rotation and friction. The particles were pre-foamed in hot air at 160° C. The average density values and effective foam gas retaining ratio values of the obtained pre-foamed particles are shown in Table 1.

It can be seen from the chart that as compared with the case of a material not impregnated with a hydrocarbon additive (shown in comparative examples) the effective gas retaining ratio values of the composition of this invention are highly superior.

When crosslinking by irradiation with an electron beam was not conducted, it was difficult to pre-foam the obtained particles to more than 5 times their original volume at atmospheric pressure.

The pre-foamed particles of this invention were put in a vented closed mold and foamed inside the mold by steam at 2 atmospheres pressure and then cooled. As a result, shaped articles free from contraction inside the mold and having apparent specific gravity of 0.04 g./cm.$^3$ was obtained.

TABLE 1

[The average apparent density and effective gas retaining ratio of the pre-foamed particles]

| Adding amount of mixed xylene (part) | Amount of the beam irradiated (Mrad) | Average apparent density (g./cm.$^3$) | Effective gas retaining ratio (percent) |
|---|---|---|---|
| 5 | 4 | 0.031 | 82 |
| 5 | 8 | 0.035 | 72 |
| 5 | 16 | 0.039 | 64 |
| 0 [1] | 0 | 0.21 | 12 |
| 0 [1] | 4 | 0.047 | 33 |
| 0 [1] | 8 | 0.056 | 44 |
| 0 [1] | 16 | 0.16 | 16 |

[1] Comparative example.

EXAMPLE 2

One hundred parts of low density polyethylene pulverized into particles of below 40 mesh (MI=3.5, specific gravity 0.92) 21 parts of azodicarbonamide, 2 parts of zinc oxide and 1.2 parts of zinc chloride were blended together. The mixture was impregnated with 5 parts of toluene in a closed container at room temperature under atmospheric pressure.

After the resulting composition was left to stand for 24 hours, it was kneaded in an extruder and extruded through orifices of 1.5 mm. diameter at a barrel temperature of 100° C. while the surface of the die was washed with hot water at 85° C. to form microbeads.

Subsequently, the microbeads were irradiated in air with an electron beam from an electron beam irradiator so that the absorbed amount of the radiation was 4 and 8 megarad. The surfaces of the resultant microbeads were coated by heating, rotation and friction with silicic anhydride. Thereafter the microbeads were pre-foamed in hot air at 160° C.

In Table 2, the average apparent density values and effective foamed gas retaining ratio values of the obtained pre-foamed microbeads are shown. As is apparent from Table 2, by impregnating with toluene, a high foaming ratio was obtained during pre-foaming.

TABLE 2

[The average apparent density and effective gas retaining ratio of the pre-foamed beads]

| Adding amount of toluene (part) | Amount of the beam irradiated (Mrad) | Average apparent density (g./cm.$^3$) | Effective gas retaining ratio (percent) |
|---|---|---|---|
| 5 | 4 | 0.025 | 88 |
| 5 | 8 | 0.042 | 59 |

EXAMPLE 3

One hundred parts of low density polyethylene pulverized into particles of below 40 mesh (MI=3.5 specific gravity 0.92), 21 parts of azodicarbonamide, 2 parts of zinc oxide and 1.2 parts of zinc chloride were mixed and the mixture was impregnated with 5 parts of cyclohexane inside a sealed container at room temperature and atmospheric pressure.

After the obtained composition was left to stand for 25 hours, it was kneaded at a barrel temperature of 100° C. in an extruder and extruded. The die of the extruder had 1.5 mm. holes. The surface of the die was washed with hot water at 85° C. Subsequently the microbeads were irradiated with an electron beam so that the absorbed amount of the radiation was 4 and 8 megarad. The surfaces of the resultant microbeads were covered by heating rotation and friction with silicic anhydride and thereafter said microbeads were pre-foamed in hot air at 160° C.

In Table 3, the average apparent density values and effective foamed gas retaining ratio values of the obtained pre-foamed beads are shown. As is apparent from Table 3, by impregnating with cyclohexane, a high foaming ratio was possible at the time of pre-foaming.

TABLE 3

| Adding amount of cyclohexane (part) | Amount of the beam irradiated (Mrad) | Average apparent density (g./cm.$^3$) | Effective gas retaining ratio (percent) |
|---|---|---|---|
| 5 | 4 | 0.034 | 74 |
| 5 | 8 | 0.033 | 76 |

EXAMPLE 4

One hundred parts of low density polyethylene pulverized into particles of below 40 mesh (MI=3.5, specific gravity 0.92), 21 parts of azodicarbonamide, 6 parts of zinc oxide and 0.6 part of zinc chloride were mixed, and the mixture was impregnated with 5 parts of styrene in a sealed container and the resultant composition was left to stand for 24 hours.

This composition was fed to an extruder and kneaded in the extruder barrel at a temperature of 105° C. Immediately thereafter the composition was extruded from a die having 1.5 mm. holes. The extruded composition was hot cut by a rotary blade. The surface of the die was washed with hot water at 85° C. The extruded foamable particles had an average specific gravity of 0.94. The beads were hardly foamed and expanded.

Subsequently the beads were irradiated with an electron beam from an electron beam accelerator so that the absorbed amount of the radiation was 4, 8, and 16 megarad. The gel division ratios after irradiation of said particles were measured and found to be 28–65%.

The obtained foamable particles were covered by rotation and friction with 3 parts of silicic acid in a Henschel's mixer at 100° C. Subsequently, the foamable particles were pre-foamed in a rotary type hot air pre-foaming device at 160° C.

The results are shown in Table 4. As compared with a system not impregnated with a hydrocarbon additive as shown in the Comparative Example 1, it can be seen that in the present invention high foaming at the time of pre-foaming was possible by the measured results of the average apparent density and effective foam gas retaining ratio.

Subsequently, the particles were irradiated with 8 megarad from an electron beam and placed in a gas permeable, but closed mold, and heated by steam at 2 atmospheres for 3 minutes. When the particles were cooled in cold water it was possible to obtain foamed polyethylene shaped articles free from contraction in the mold having an apparent density of 0.032 g./cm.$^3$. As shown in Table 4, in a similar mixture which was not irradiated with an electron beam the gas retaining ratio at the time of pre-foaming was inferior, and a high foam ratio was not obtained.

TABLE 4

| Amount of the irradiated beam (Mrad) | Average apparent density (g./cm.$^3$) | Effective foamed gas retaining ratio (percent) |
|---|---|---|
| 0 | 0.20 | 12 |
| 4 | 0.027 | 93 |
| 8 | 0.030 | 83 |
| 12 | 0.0 0 | 83 |
| 16 | 0.042 | 60 |

Comparative Example 1

Example 4, was repeated except that the styrene was not not impregnated into the mixture. The composition was hot cut and pelletized. At a barrel temperature of 105° C. the composition foamed somewhat during extrusion and the average specific gravity of the obtained foamable beads was lowered to 0.82.

Subsequently, the particles were irradiated with an electron beam from an electron beam acceleator so that the absorbed amount of the beam was 4, 8. 12, 16 megarad. The surfaces of the irradiated particles were covered by rotation and friction with 3 parts of silicic acid using a Henschel's mixer. The foamable particles were pre-foamed by a rotary hot air pre-foaming device at 160° C. The results are shown in Table 5. In this system in which the beads are not impregnated with styrene, the gas retaining ratio at the time of pre-foaming is low and the foamable particles cannot be highly foamed.

Pre-foamed articles made of this material were irradiated with 4 megarad by an electron beam and foamed inside a mold by heating the mold with steam under 2 atmospheres. However, it was found that the molded article contracted during cooling. The apparent density of the shaped article contracted in the mold was 0.085 g./cm.³

TABLE 5

| Amount of the irradiated beam (Mrad) | Average apparent density (g./cm.³) | Effective foamed gas retaining ratio (percent) |
|---|---|---|
| 4 | 0.047 | 53 |
| 8 | 0.056 | 44 |
| 12 | 0.077 | 32 |
| 16 | 0.161 | 16 |

EXAMPLE 5

Example 4 was repeated except that the amount of the impregnated styrene was increased to 10 parts. The results are shown in Table 6, from which it can be seen that in system in which a hydrocarbon additive impregnated into the polyolefin composition the gas retaining ratio at the time of pre-foaming is high and the foamable particles can be highly foamed.

TABLE 6

| Amount of the irradiated beam (Mrad) | Average apparent density (g./cm.³) | Effective foamed gas retaining ratio (percent) |
|---|---|---|
| 4 | 0.028 | 89 |
| 8 | 0.027 | 92 |
| 12 | 0.031 | 80 |
| 16 | 0.040 | 73 |

EXAMPLE 6

Example 4 was repeated except that instead of the low density polyethylene, an ethylene-vinyl acetate copolymer (containing 14% of vinyl acetate) was used. Foamable beads were extruded and irradiated with 4 megarad from an electron beam, and prefoamed. As a result of the prefoamed particle had an apparent density of 0.030 g./cm.³

EXAMPLE 7

Example 4 was repeated except that the low density polyethylene was mixed and kneaded with 30 parts of a styrene-butadiene copolymer to prepare foamable particles by a method similar to that of Example 4. The particles were irradiated with an electron beam so that the absorbed amount of the radiation was 4 megarad and prefoamed. As a result it was possible to obtain pre-foamed particles having an apparent density of 0.027 g./cm.³

Comparative Example 2

One hundred grams of low density polyethylene (Mirathon #16 manufactured by Mitsui Polychemical Co. Ltd.) was irradiated with a beam from a Von de Graaff accelerator so that the total absorbed amount of radiation was 2 megarad.

The resultant irradiated powder was immersed in a pressure proof glass container in which 200 g. of styrene monomer had previously been charged. The container was filled with nitrogen gas and the powder was left to stand at 40° C. for 7 hours to graft polymerize.

Immediately after the polymerization, the obtained polymer was filtered and the remaining monomer and polystyrene homopolymer were removed by extraction with toluene and methanol. Thereafter the polymer was vacuum dried for 24 hours. From the increase of the weight the apparent graft ratio was measured. The apparent graft ratio of this polyethylene-styrene graft copolymer was 49.1%.

This graft polymer was cut into pellets having a diameter of 4 mm. The resultant pellets were immersed in 4 time their weight of a 4:6 benzene-petroleum ether composition and impregnated at 60° C. for 16 hours.

The impregnated particles were pre-foamed in hot air at 180° C. Foamed particles having an apparent density of only 0.22 to 0.28 g./cm.³ were obtained. Moreover, many particles contained 1 to 5 large single cells of more than 1000 m. The foamed particles were inserted in a mold and shaped inside the mold. However, amounts of contraction on cooling was excessive and a satisfactory foamed shaped article could not be obtained.

Comparative Example 3

The impregnated polyethylene-styrene graft polymer prepared in comparative Example 2 was further irradiated with 2 megarad from an electron beam and heated and foamed in hot air at 180° C. However, a foam containing only one pore having an apparent density of 0.63 to 0.81 g./cm.³ and having no gas retaining properties was obtained.

Comparative Example 4

To 100 parts of the polyethylene-styrene graft polymer containing 49.1% of styrene prepared in Comparative Example 2, 10 parts of a decomposition type foaming agent, azodicarbonamide, and 1 part of zinc oxide were added. The mixture was kneaded by mixing rolls at 150° C. and thereafter it was made into pellets having a diameter of 4 mm. When these pellets were heated and foamed in hot air at 220° C., a foam having an apparent density of 0.42 to 0.57 g./cm.³ was obtained.

The graft copolymer pellets mixed with azodicarbonamide and zinc oxide was again irradiated with an electron beam so that the absorbed amount of radiation was 2 megrad. When the pellets were heated and foamed in hot air at 220° C., a foam consisting of very fine pores of an average diameter of 400μ and having an apparent density of 0.095 to 0.11 g./cm.³ was obtained.

As is apparent from the foregoing examples and comparative examples, it is necessary to irradiate the foamable particles impregnated with a hydrocarbon additive. When the graft copolymer was impregnated with an evaporation type foaming agent and foamed, foams were not obtained having an apparent density below 0.1 g./cm.³ Moreover, foam particles having only 1–5 large pores were obtained.

EXAMPLE 8

One hundred parts of low density polyethylene, 18.6 parts of azodicarbonamide, 1.9 parts of zinc oxide, 0.5 part of zinc acetate and 10 parts of styrene were fed to a mono-axial extruder having a diameter of 90 mm. The mixture was kneaded at a controlled temperature of 130° C. The nozzle of the extruder had 92 orifices, each having a diameter of 1.0 mm. The mixture was extruded from the orifices directly into hot water at 90° C. and immediately thereafter the extruded mixture was cut into lengths of about 1.1 mm. by a rotary blade.

After the extruded mixture was immersed in hot water for 1.5 minutes it was dried. The particles were uniform non-expanded and spherical having a diameter of 1.1 mm. At 60 r.p.m. of the extruder, a discharged rate of 130 kg./hr. was maintained and about 130,000,000 foamable particles were produced.

Subsequently, an electron beam was used to irradiate the particles so that the absorbed amount of radiation was 8 megarad. When the gel division ratio of the particles was measured after irradiation, it was found to be 42%.

The surfaces of the obtained particles were coated with 6 parts of silicic acid in a preheated Henschel's mixer. The particles were heated in hot air furnace at 210° C. for 5 minutes. The particles were not fused but did foam and the foamed particles had very fine pores and an apparent density of 0.033 (g./cc.). These foamed particles were put in a mold, into which hot air at 180° C. was blown and said particles were shaped under a pressure of 3 kg./cm.$^2$. As a result a foamed shaped article having a smooth surface, an apparent density of 0.046 (g./cc.) and free of large pores was obtained.

On the other hand, when the pre-foaming was conducted in hot air furnace at 180° C. for 3 minutes, the prefoamed particles which were obtained had an apparent density of 0.88 (g./cc.). When the pre-foamed particles were put inside a pressure-proof, vented mold, into which steam was blown under a pressure of 4 kg./cm.$^2$ for 3 minutes the resulting foamed shaped articles had very fine pores and a smooth surface. The volume contraction ratio was 8.4% and the apparent density of 0.052 (g./cc.).

EXAMPLE 9

Fifty parts of high density polyethylene, 30 parts of low density polyethylene and 20 parts of an ethylene-vinyl acetate copolymer (containing 26% of vinyl acetate) were initially pelletized in an extruder set at a barrel temperature of 180° C. and thereafter the resultant pellets were pulverized into particles of below 40 mesh by a turbomill pulverizer. One hundred parts of the powder of this mixed resin, 16 parts of azodicarbonamide, 3.2 parts of zinc oxide, 0.52 parts of zinc phthalate and 10 parts of styrene were kneaded while the resin temperature was controlled at a temperature below 130° C. in an extruder as in Example 8. The material was then directly extruded into hot water at 92° C. and cut.

The particles were non-foamed, uniform, spherical particles having a diameter of 1.1 mm. The particles were irradiated with an electron beam from an electron beam accelerator so that the absorbed amount of radiation was 10 megarad. The gel division ratio of these particles was 48%.

The surfaces of these foamable particles were coated by rotation and friction with 6 parts of silicic acid and prefoamed in a hot air furnace at 220° C. for 5 minutes. As a result it was possible to obtain foamable particles having very fine pores and an apparent density of 0.035 (g./cc.).

These foamable particles were put inside a mold in which hot air at 180° C. was blown and the particles were shaped under a pressure of 3 kg./cm.$^2$. As a result it was possible to obtain foamed shaped articles having smooth surfaces and an apparent density of 0.043 (g./cc.).

On the other hand, when the pre-foaming was carried out in the hot air furnace at 180° C. for 3 minutes, it was possible to obtain pre-foamed particles having an apparent density of 0.097. When these pre-foamed particles were put inside a pressure-proof vented mold, into which steam was blown under pressure of 4 kg./cm.$^2$ for 3 minutes, a foamed shaped article was obtained having a uniform fine pore structure, free from collapse, and having smooth surfaces, a volume contraction ratio of 68% and an apparent density of 0.061 (g./cc.).

Comparative Example 5

Example 8 was repeated except the mixture was extruded into air. Once cooled in the form of continuous filaments, it was then cut into particles. The particles were cylindrical. The discharged rate was 130 kg./hr. at 60 r.p.m. It was difficult to cut 92 filaments at a time and the lengths of the particles were non-uniform varying from 1 to 5 mm. The transportation of the particles was difficult. The particles were irradiated with 8 megarad from an electron beam. However, due to non-uniformity of shapes, there were considerable variations in the absorbed amount of radiation.

As a result of pre-foaming of the particles at 210° C., the apparent density of the foamed particles was 0.042 (g./cc.), and as a result of shaping these foamed particles in hot air under pressure of 3 kg./cm.$^2$, shaped articles having an apparent density of 0.064 (g./cc.) was obtained. However, the surfaces of the shaped articles were uneven and poor. The articles included large voids and were unsuitable for use as a cushion material. From this, it can be seen that the granular shape should preferably be spherical.

Comparative Example 6

Example 8 was repeated except the mixture was extruded into cold water at 30° C. The nozzle was cooled and often became blocked and the head pressure rose. The rotating speed could not be raised above 20 r.p.m. The discharged rate of material was lowered. The particles were as solid and were not spherical.

Comparative Example 7

Foamable particles produced in accordance with Example 8 except that they were not irradiated with an electron beam as in Example 8, were foamed in hot air under the same conditions as in Example 8. The generated gas bubbles could not be retained and the foam collapsed. The foamed particles had an apparent density of only 0.64 (g./cc.).

However, when the foamed material of Example 8 was irradiated so that the absorbed amount of radiation was 25 megarad the tensile strength of the resulting cellular film was quite high. The relative amount of foaming was poor and the foamed particles had an apparent density of 0.23 (g./cc.).

Comparative Example 8

Example 8 was repeated except the styrene was not impregnated into the polyolefin. The mixture was extruded at a barrel temperature of 130° C. and a screw r.p.m. of 50 r.p.m. The mixture foamed inside the extruder and particles having an average apparent density of 0.42 (g./cc.) was obtained.

These particles were irradiated with an electron beam so that the absorbed amount of radiation was 8 megarad. The prefoamed particles had an apparent density of only 0.076 (g./cc.). The particles were thereafter completely pre-foamed inside the extruder. However, when the barrel temperature of the extruder was lowered to 110° C. it was possible to stop foaming inside the extruder, however, the head pressure exceeded 250 kg./cm.$^2$ and the extruder could not be operated safely. A small amount of a sample forcibly prepared under these unsafe conditions was completely pre-foamed in a manner similar to that of the material impregnated with styrene prepared in Example 8. The foamed particles had an apparent density of 0.033 g./cc. However, in the material which did not contain styrene, the particles were foamed only to an apparent density of 0.046 g./cc. (foaming magnification 22 times).

EXAMPLE 10

Example 8 was repeated except that instead of 100 parts of low density polyethylene, a mixed system of 80 parts of low density polyethylene and 20 parts of low cis-polybutadiene was used. There was no problem at all and spherical particles were obtained. The material was irradiated with an electron beam so that the absorbed amount of radiation was 8 megarad. The material was pre-foamed in hot air. Satisfactory foamed particles having an apparent density of 0.039 (g./cc.) were obtained.

EXAMPLE 11

One hundred parts of a crystalline propylene-ethylene copolymer having an isotactic degree of 65 and containing 4% of ethylene, 15 parts of azodicarbonamide, 0.8 part of zinc oxide, 4 parts of styrene, 4 parts of divinyl benzene and 0.3 part of a heat stabilizer were mixed and kneaded in the extruder as in Example 8. The resin temperature was controlled to below 165° C. The mixture was extruded into hot water at 95° C. and the extruded mixture was cut in the water so that the lengths were 1.2 mm. It was possible to obtain spherical particles having a diameter of 1.2 mm. that were almost unfoamed.

Subsequently, the extruded material was irradiated with an electron beam accelerator until the absorbed amount of radiation was 8 megarad. The completely pre-foamed article of said particles had an apparent density of 0.041 (g./cc.).

The pre-foaming was stopped at the apparent density of 0.11 (g./cc.) and steam under a guage pressure of 7 kg./cm.$^2$ was blown into a pressure-proof, vented, mold in which said particles had been placed. The particles were foamed and a shaped article consisting of a uniform and very fine independent bubbles having smooth surfaces and an apparent density of 0.054 g./cc. were obtained.

We claim:
1. The process for the preparation of foamable polyolefinic particles which comprises:
   (a) uniformly blending together (1) a polyolefinic composition consisting essentially of a polyolefinic resin selected from the group consisting of polymers, copolymers, and blends of α-olefins having 2–6 carbon atoms and a mixture containing at least 50 mol percent of said polyolefinic resin and second polymer selected from the group consisting of chlorinated polyethylene, chlorinated polypropylene, polybutadiene, polyisoprene, polyisobutene, styrene-butadiene, polyvinyl chloride and polyamide, (2) about 1–30% based on the weight of said polyolefinic compositions of a hydrocarbon additive having a boiling point above the melting point of said polyolefinic composition and, (3) a foaming agent which decomposes at a temperature above the softening point of said polyolefinic compositions and generates a gas, said foaming agent being present in an amount sufficient to increase the foaming magnitude 1–30%;
   (b) shaping the resulting mixture into substantially void-free particles and thereafter;
   (c) crosslinking said polyolefinic compositions by irradiating said particle until a gel ratio of 10–80% is obtained.
2. The process according to claim 1 wherein the polyolefinic composition consists essentially of a polymer, a copolymer, or a polymer blend of an α-olefin having 2 to 6 carbon atoms.
3. The process according to claim 1 wherein the polyolefinic composition consists essentially of a member selected from the group consisting of polyethylene, polypropylene, ethylenepropylene copolymer, ethylene vinyl acetate copolymer and mixtures thereof.
4. The process according to claim 1 wherein the hydrocarbon additive is a member selected from the compound of the formula:

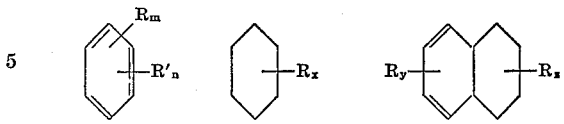

wherein R is an alkyl radical having 1 to 8 carbon atoms, R′ is an alkenyl radical having one unsaturated double bond and 2 to 8 carbon atoms, $m$ is an integer from 0 to 3, $n$ is an integer from 0 to 6, $n+m$ is an integer from 0 to 6, $x$ is an integer from 0 to 6, and $y$ and $z$ are both integers of 0 to 4.

5. The process according to claim 1 wherein the hydrocarbon additive is selected from the group consisting of benzene, toluene, xylenes, styrene, cyclohexane, Tetralin and mixtures thereof.

6. The process according to claim 1, wherein the foaming agent has a decomposition temperature higher than the softening point of polyolefinic composition and lower than about 200° C.

7. The process according to claim 1, wherein the foaming agent has a decomposition temperature of 100° C. to 160° C.

8. The process according to claim 1 wherein the foamable particles are crosslinked to have a gel ratio of 20–60%.

9. The process according to claim 1 wherein said particles are irradiated with radial radiation.

10. The process according to claim 1 wherein said particles are irradiated with ultraviolet radiation.

11. The process according to claim 1 wherein the particles are formed by extruding the mixture into a strand and thereafter cutting said strand into particles.

12. The process according to claim 11 wherein the mixture is extruded directly into hot water at a temperature about 50° C. to 100° C. and cut immediately after extrusion in the hot water.

13. The process according to claim 12 wherein the particles are retained in the hot water until the temperature of the particles becomes substantially the same as that of the hot water.

14. The process according to claim 11 wherein the particles have a diameter of 0.1 to 6 mm. and an average volume of 0.01 to 2 cc.

References Cited
UNITED STATES PATENTS

| | | | |
|---|---|---|---|
| 3,562,367 | 2/1971 | Shinohard et al. | 204—159.2 |
| 3,592,785 | 7/1971 | Patterson et al. | 260—254 A |
| 3,432,447 | 3/1969 | Patterson et al. | 204—159.2 |
| 3,484,352 | 12/1969 | Cines et al. | 204—159.18 |
| 3,013,957 | 12/1961 | Waddington | 204—159.22 |

SAMUEL H. BLECH, Primary Examiner

R. B. TURER, Assistant Examiner

U.S. Cl. X.R.

204—159.14, 159.19; 260—2.5 E, 2.5 E, 2.5 P, 2.5 R, 33.6 PQ, 857, 889, 897 C